United States Patent [19]
Balling et al.

[11] Patent Number: 5,946,511
[45] Date of Patent: Aug. 31, 1999

[54] SINGLE ACTUATOR FOR MOTOR CONTROL IN A CAMERA

[75] Inventors: Edward N. Balling, Rochester; Joel S. Lawther, East Rochester, both of N.Y.

[73] Assignee: Eastman Kodak Company, Rochester, N.Y.

[21] Appl. No.: 09/035,449

[22] Filed: Mar. 5, 1998

[51] Int. Cl.$^6$ ...................................................... G03B 17/42
[52] U.S. Cl. .......................... 396/401; 396/403; 396/418
[58] Field of Search ................................. 396/6, 401, 402, 396/403, 404, 405, 411, 418

[56] References Cited

U.S. PATENT DOCUMENTS

| | | |
|---|---|---|
| 3,995,292 | 11/1976 | Kondo . |
| 4,256,394 | 3/1981 | Haraguchi et al. . |
| 4,637,702 | 1/1987 | Kazami et al. . |
| 5,617,164 | 4/1997 | Siekierski et al. . |

*Primary Examiner*—Howard B. Blankenship
*Attorney, Agent, or Firm*—Roger A. Fields; Marc A. Rossi

[57] ABSTRACT

An actuator mechanism of simple and inexpensive design is incorporated in a camera structure to control a motor advance film winding system. The actuator includes a metering mechanism interface, a motor activation switch interface, and a shutter mechanism interface. In operation, a metering mechanism of a camera contacts with the metering mechanism interface in an exposure ready state to hold the actuator in an initial position in which the motor activation switch interface interfaces with a moveable contact of a motor switch to prevent contact between the moveable contact and a stationary contact of the motor switch. When a shutter mechanism of the camera is depressed, the shutter mechanism interfaces with the shutter mechanism interface to hold the actuator in the initial position and also moves the metering mechanism out of contact with the metering mechanism interface. The actuator moves to the contact position when the shutter mechanism is released, thereby causing the motor of the camera to be activated to advance the film. The advancement of the film resets the metering mechanism to the exposure ready state such that the actuator is returned to the initial position and the motor is deactivated.

8 Claims, 12 Drawing Sheets

SINGLE ACTUATOR FOR MOTOR CONTROL IN A CAMERA

FIELD OF THE INVENTION

The invention is directed in general to photographic cameras including a motor advance film winding system. In particular, the invention is directed to a single actuator of simple and economical design that operates the motor advance film winding system of a photographic camera. The single actuator can be readily incorporated in single use cameras employing film winding systems.

BACKGROUND OF THE INVENTION

It is commonly known to use several switches to operate the motor advance film winding system of a photographic camera as film is wound after completion of an exposure operation. In conventional systems, for example, one switch is generally operated from a shutter release mechanism of the camera to turn on a film winding motor, while a second switch is operated from the film metering system to turn off the film winding motor. Various mechanical mechanisms have been utilized to activate the switches in conventional motor advance film winding systems.

It has recently been proposed that the feature of a motor advance film winding system be incorporated into so called "single use" or "disposable" cameras to provide additional convenience for the consumer. Single use cameras, however, must be of simple and economical design in order to be commercially practical. Accordingly, in order to incorporate a motor advance film winding system in a single use camera, it is desirable to provide a control mechanism of simple, reliable and inexpensive design, as compared with conventional systems, to control the operation of the film advance motor.

In view of the above, it is an object of the invention to provide a mechanism for controlling the operation of a motor advance film winding system that can be readily incorporated into a single use camera.

SUMMARY OF THE INVENTION

The invention provides an actuator mechanism of simple and inexpensive design that is incorporated in a camera structure to control a motor advance film winding system. In a preferred embodiment, a camera is provided that includes: a power source; a motor coupled to a film advance gear train; a motor activation switch, including a stationary contact and a moveable contact, coupled to the power source and the motor; a shutter mechanism; a metering mechanism; an actuator including a metering mechanism interface, a motor activation switch interface, and a shutter mechanism interface; and a spring for normally biasing the actuator to a contact position where the motor activation switch interface permits contact between the moveable contact and the stationary contact.

In operation, the metering mechanism contacts with the metering mechanism interface in an exposure ready state to hold the actuator in an initial position in which the motor activation switch interface interfaces with the moveable contact to prevent contact between the moveable contact and the stationary contact. When the shutter mechanism is depressed, the shutter mechanism interfaces with the shutter mechanism interface to hold the actuator in the initial position and also moves the metering mechanism out of contact with the metering mechanism interface. The actuator moves to the contact position when the shutter mechanism is released, thereby causing the motor to be activated to advance the film. The advancement of the film resets the metering mechanism to the exposure ready state such that the actuator is returned to the initial position and the motor is deactivated. The camera also preferably includes an active lightlock driver that interfaces with an active lightlock interface on the actuator to return the actuator to the initial position at an end of roll.

The single actuator provides a simple and inexpensive method of controlling the operation of the film advance motor both after each metering operation and after the completion of an entire roll of film. Other advantages and features of the invention will become apparent from the following detailed description of the preferred embodiments of the invention.

BRIEF DESCRIPTION OF THE DRAWINGS

The invention will be described in greater detail with reference to certain preferred embodiments thereof and the accompanying drawings, wherein.

DETAILED DESCRIPTION OF THE INVENTION

Figure 1:
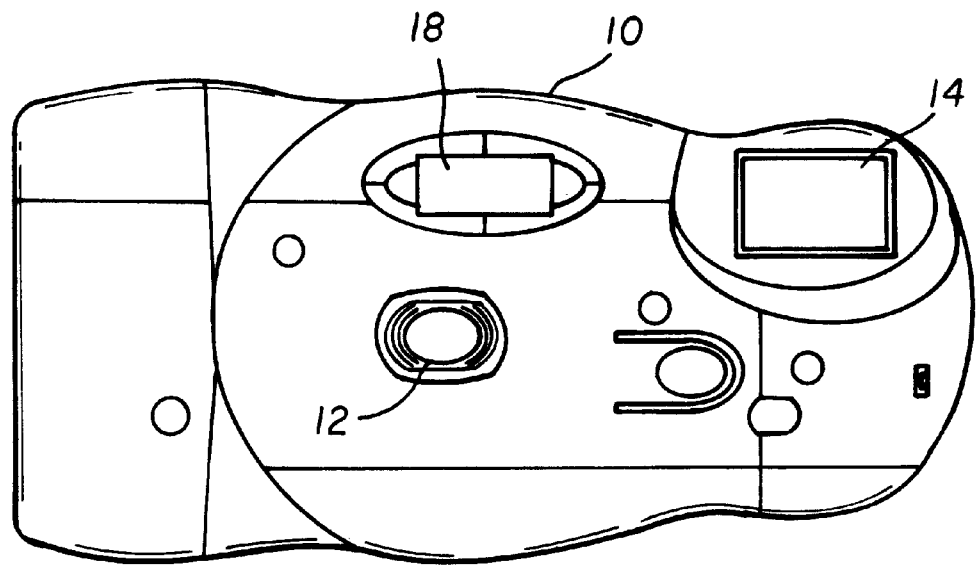
FIG. 1 is a front view of a single use photographic camera in accordance with the present invention.
Figure 14:
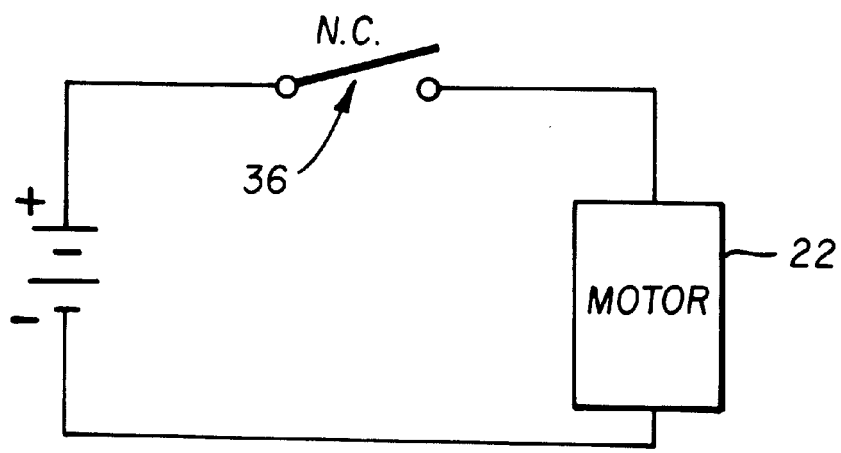
FIG. 14 is an electrical schematic diagram illustrating the interconnection of the film advance motor, film advance motor switch and power supply of the camera illustrated
Figure 2:
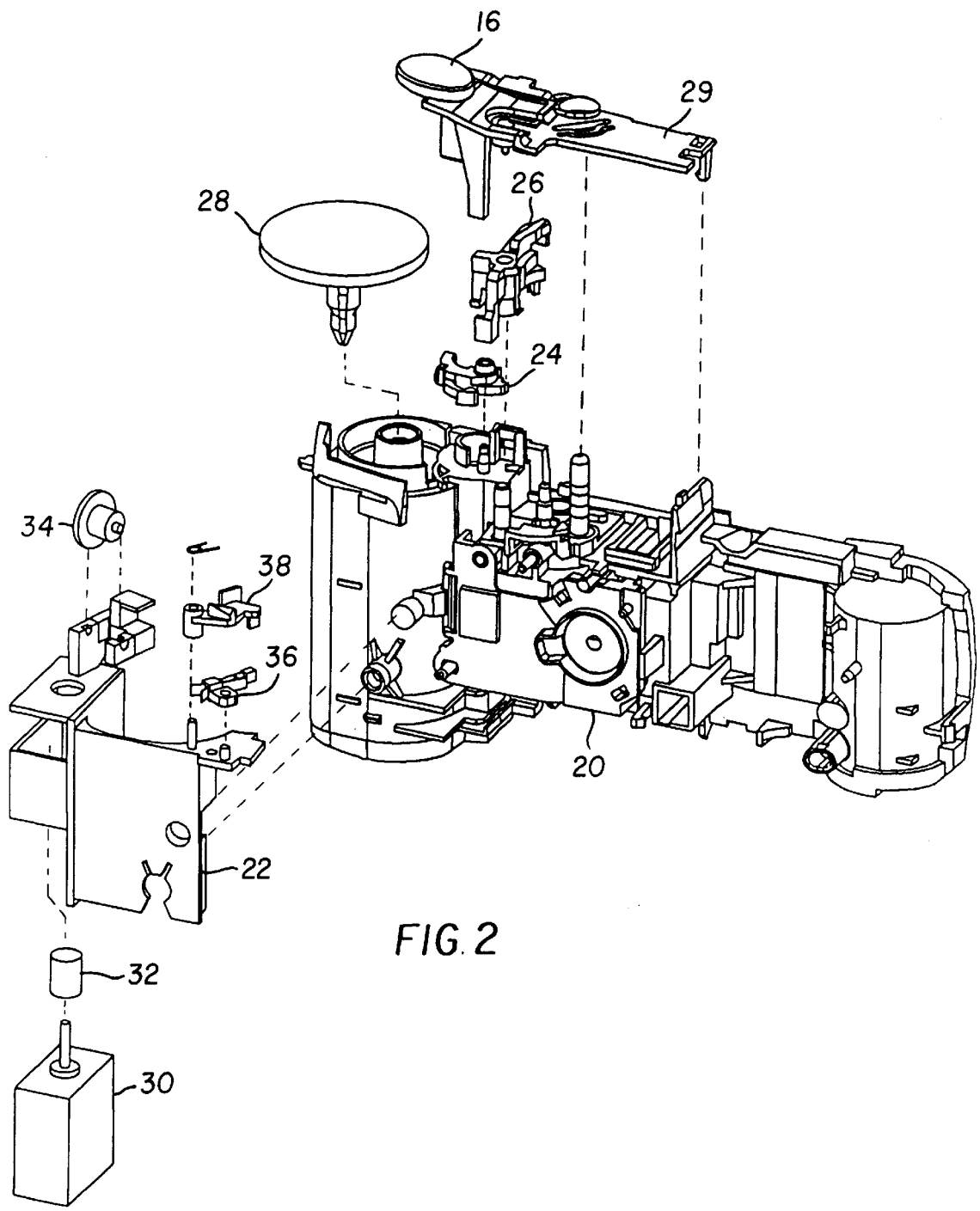
FIG. 2 is an exploded view of internal components, including a camera frame, of the single use photographic camera illustrated in FIG. 1.

FIG. 1 illustrates a single use camera 10 including a lens 12, an electronic flash unit 14, a shutter release mechanism 16, and an optical viewfinder 18. As shown in FIG. 2, the single use camera 10 is provided with an internal camera frame 20 on which various components are mounted including a motor mount 22, an active lightlock driver 24, a metering mechanism 26, a face gear 28, and a keeper plate 29 on which the shutter release mechanism 16 is located. A film advancing motor 30 is coupled to the motor mount 22 and has an attached pinion gear 32 that interfaces with a cluster gear 34 also mounted on the motor mount 22. The pinion gear 32, cluster gear 34 and face gear 28 constitute the film advance gear train of the single use camera 10. A motor activation switch 36 is also mounted on the motor mount 22 along with an actuator 38 which will be described in greater detailed below. The motor activation switch 36, which in the illustrated embodiment is a normally closed switch, is coupled to a battery power supply of the camera and to the film advancing motor 30, and controls the supply of power from the battery power supply to the film advancing motor 30. A simple schematic diagram illustrating the interconnection of the motor activation switch 36, the battery power supply and the film advancing motor 30 is shown in FIG. 14.

Figure 3:
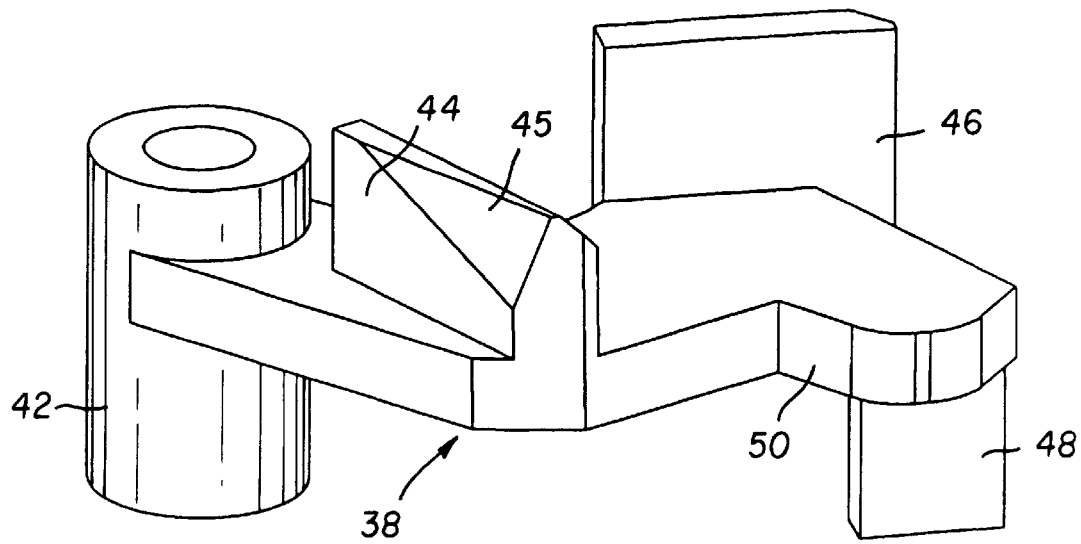
FIG. 3 illustrates an actuator incorporated in the camera of FIG. 1 in accordance with the invention.
Figure 4:
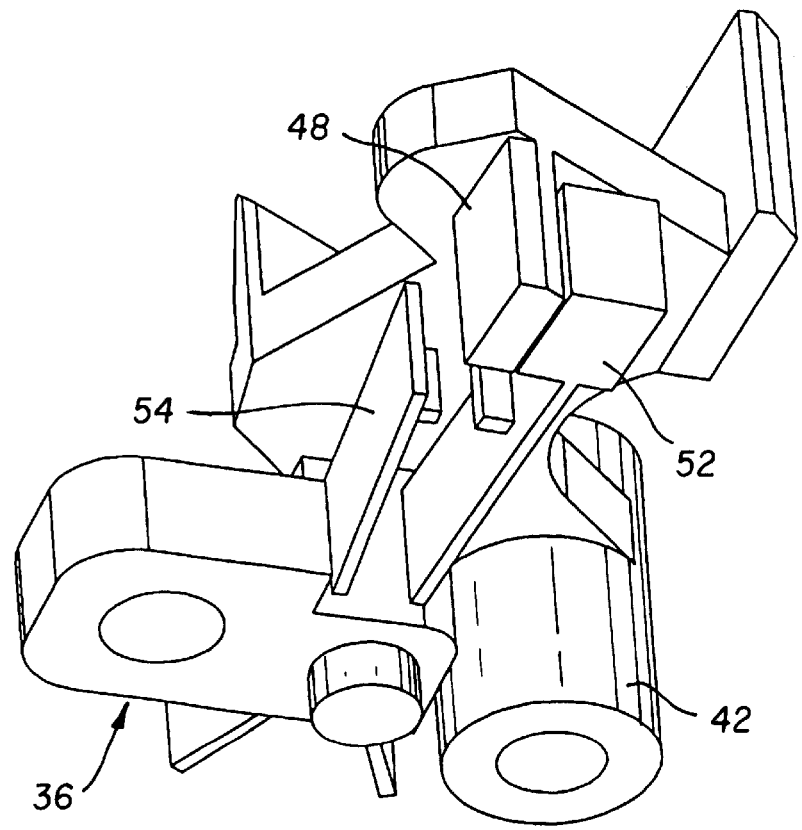
FIG. 4 is a bottom perspective view of the interfacing of the actuator of FIG. 3 with a motor activation switch.

The actuator 38 includes a actuator pivot mounting 42, which is fitted on a mounting pin located on the motor mount 22, a shutter mechanism interface 44 including a lead in face 45, an active lightlock interface 46, a switch interface 48 and a metering mechanism interface 50 as shown in FIG. 3. The switch interface 48 interfaces with a moveable switch contact 52 on the motor activation switch 36, as shown in FIG. 4, to prevent the moveable switch contact 52 from coming into contact with a stationary switch contact 54 of the motor activation switch 36 in the normally closed position. In order to permit the moveable switch contact 52 and stationary switch contact 54 of the motor activation switch 36 to close, and thereby activate the film advancing motor 30, the actuator 38 must pivot so that the switch interface 48 is moved to a position that allows the moveable switch contact 52 to come into contact with the stationary switch contact 54.

Figure 5:
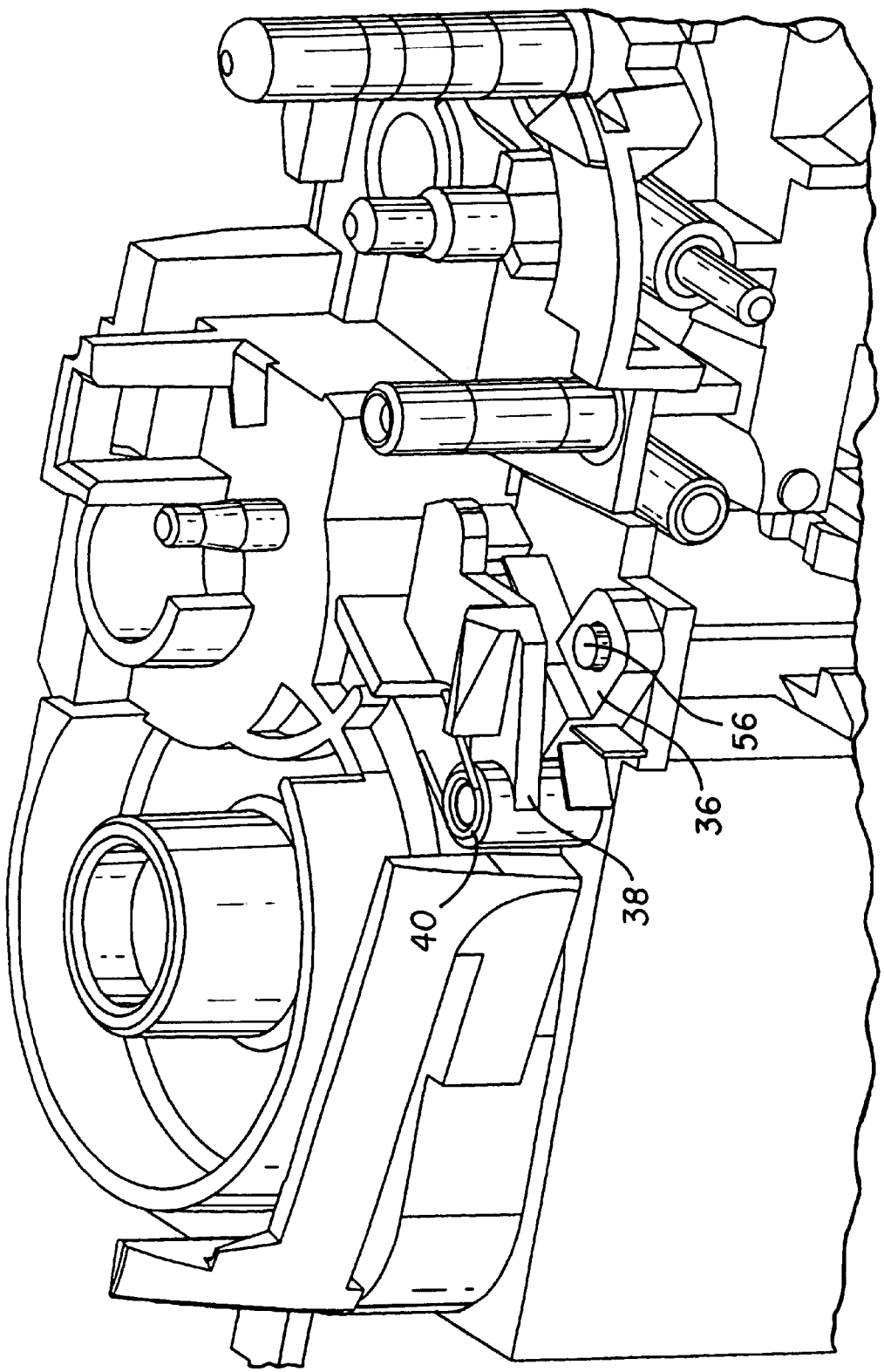
FIG. 5 illustrates the location of the actuator and switch of FIG. 4 mounted in the camera frame illustrated in FIG. 2.
Figure 6:
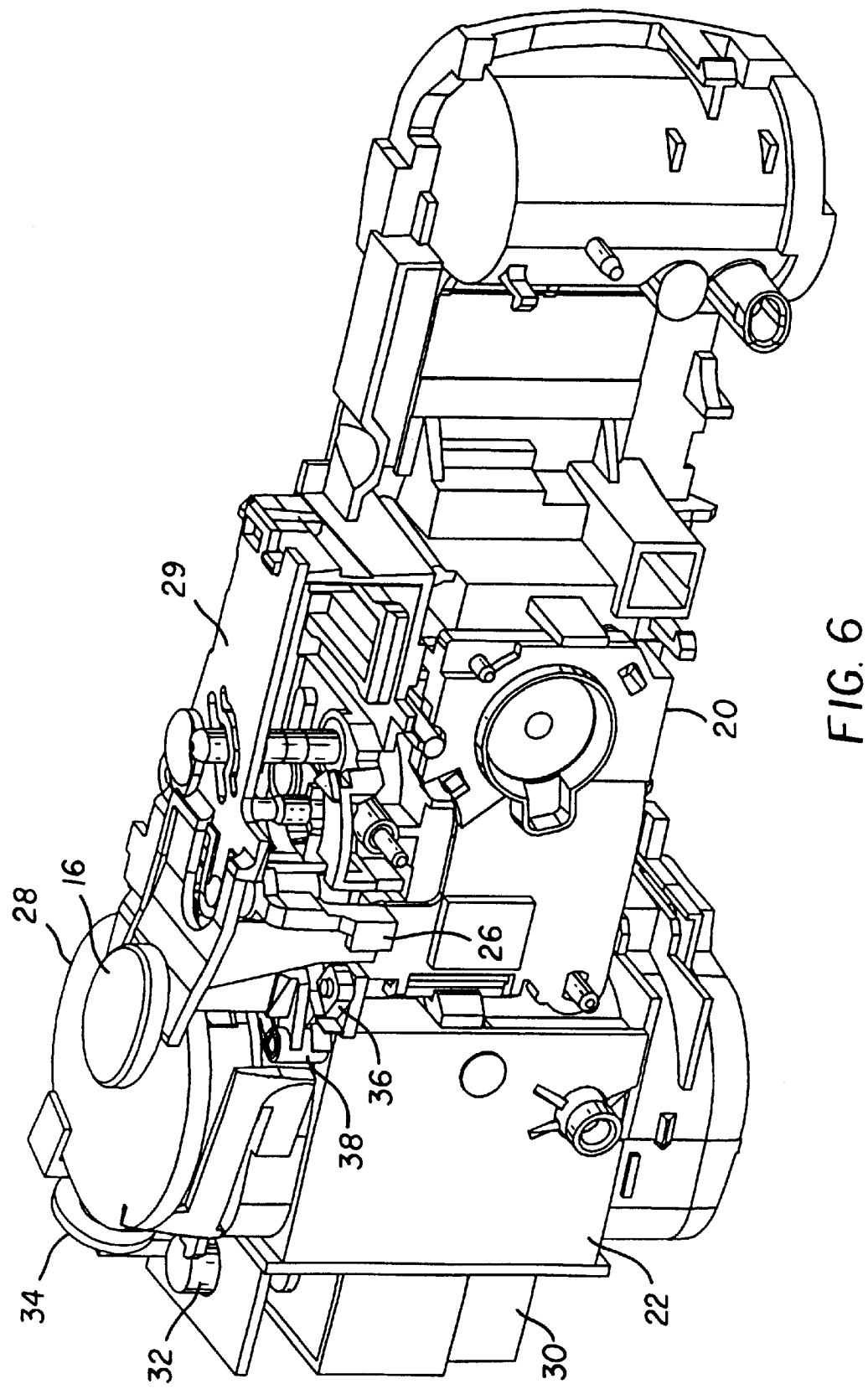
FIG. 6 illustrates the assembly of the internal components illustrated in FIG. 2.

FIG. 5 illustrates the placement of the actuator 38 and motor activation switch 36 when the motor mount 22 is coupled to the camera frame 20. The motor activation switch 36 is located beneath the actuator 38 on a switch locator pin 56. The actuator 38 is normally biased by a spring 40 to pivot forward, but is held by the metering mechanism 26 (not shown in FIG. 5) in an initial state prior to an exposure operation such that the switch interface 48 causes the moveable contact 52 to be separated from the stationary switch contact 54 as shown in FIG. 4. FIG. 6 illustrates the completed assembly of all illustrated components onto the camera frame 20.

Figure 7:
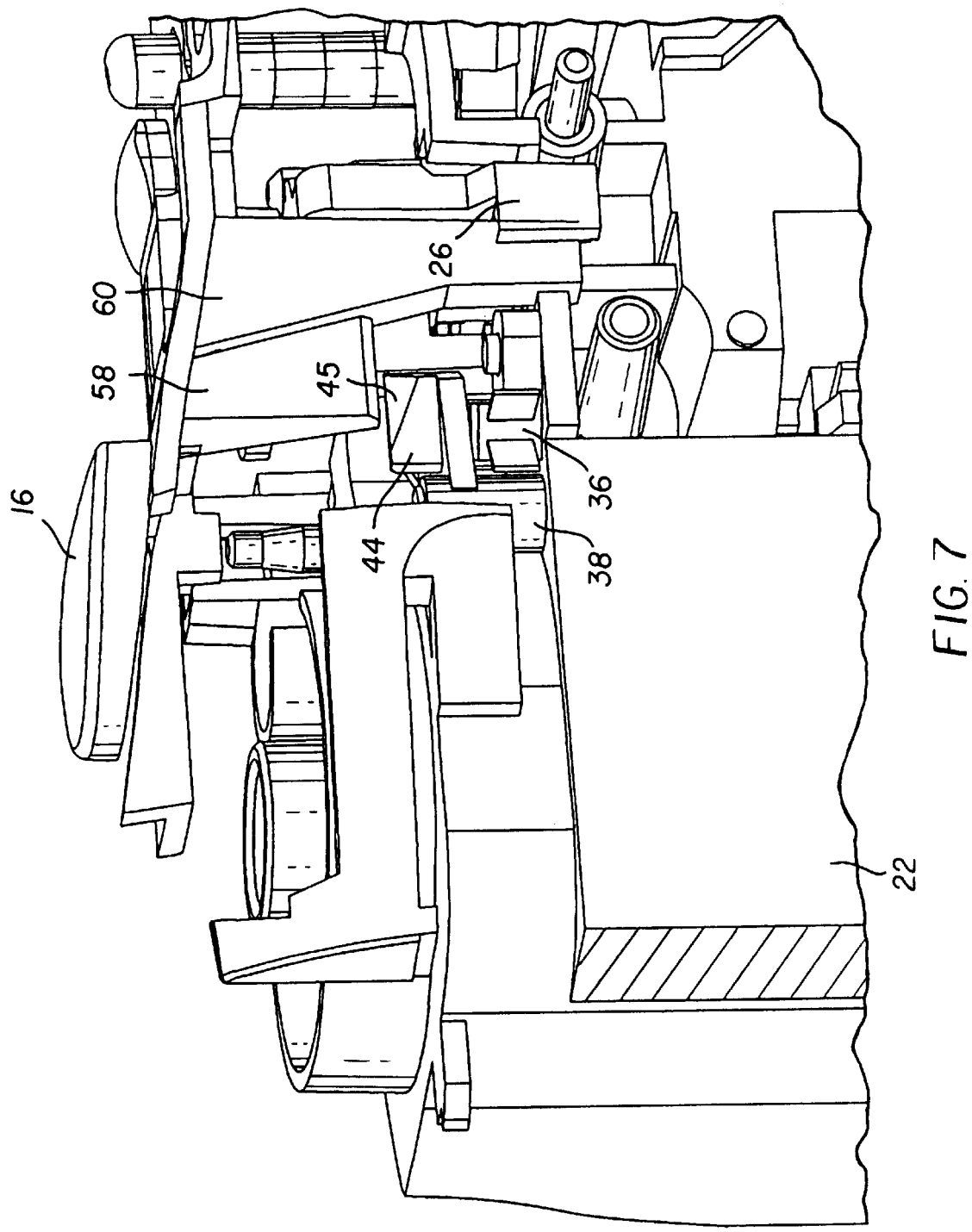
FIG. 7 illustrates the respective locations of the shutter mechanism, actuator and metering mechanism in an initial position.
Figure 8:
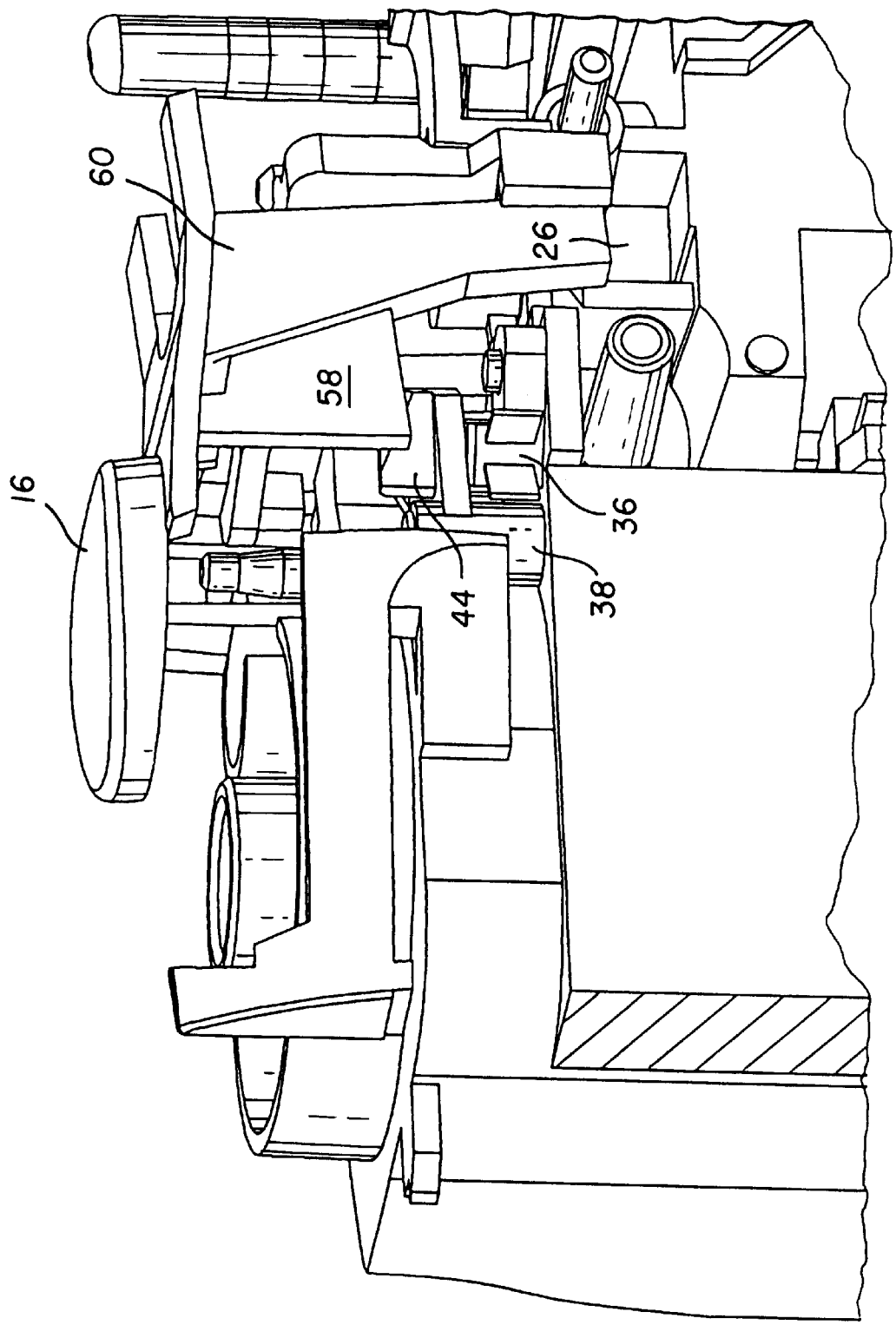
FIG. 8 illustrates the respective locations of the shutter mechanism, actuator and metering mechanism upon depression of the shutter mechanism.
Figure 9:
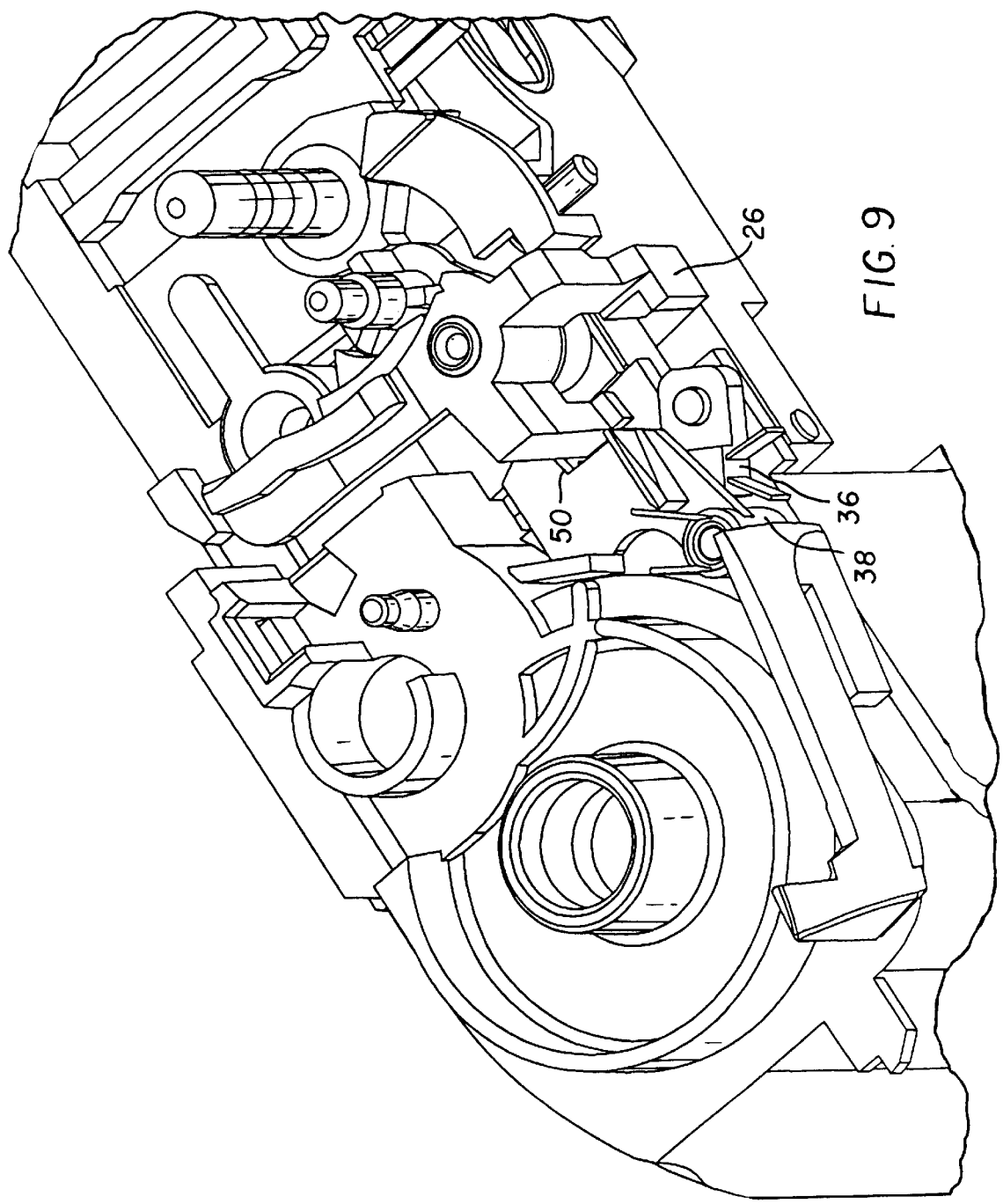
FIG. 9 is a top view illustrating the position of the actuator and metering mechanism in the initial position.
Figure 10:
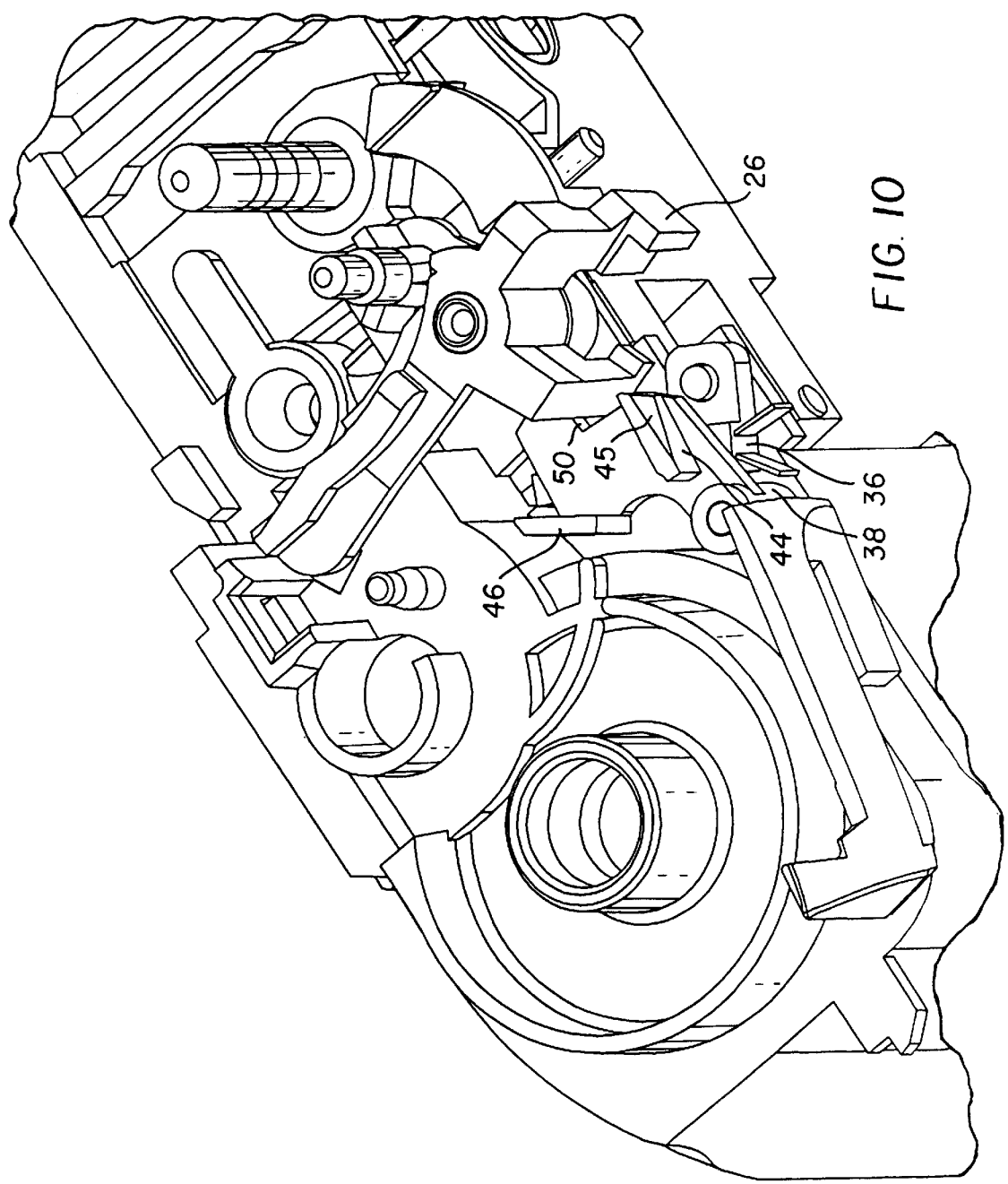
FIG. 10 is a top view illustrating the position of the actuator and metering mechanism as the shutter mechanism is depressed.

The operation of the actuator 38 will now be described in greater detail. FIG. 7 illustrates the camera 10 in the initial state as it is ready to expose an image. The shutter mechanism 16 is in a raised position such that an actuator stop 58 provided on the shutter mechanism 16 is located above the shutter mechanism interface 44 of the actuator 38. As explained above, the motor activation switch 36 is in the "off" position, namely, the moveable switch contact 52 is separated from the stationary switch contact 54 by the application of pressure from the switch interface 48 (FIG. 3). The actuator 38, which is biased to pivot forward by the actuator spring 40, is held in position by the interface of the metering mechanism interface 50 of the actuator 38 with the metering mechanism 26, as shown in greater detail in See FIG. 9. The depression of the shutter mechanism 16 to initiate an exposure operation, as illustrated in FIG. 8, causes the actuator stop 58 to be placed in contact with the shutter mechanism interface 44 of the actuator 38. In order to provide a smooth movement, the actuator stop 58 first contacts the angled lead in face 45 before sliding in front of the shutter mechanism interface 44. In addition, an extended arm 60 of the shutter mechanism 16 rotates the metering mechanism 26 out of contact with the metering mechanism interface 50 of the actuator 38 into a position illustrated in FIG. 10. In this position, the actuator 38 is no longer held in place by the metering mechanism 26, but is prevented from pivoting by the interface of the actuator stop 58 with the shutter mechanism interface 44. As the actuator 38 cannot pivot, the switch interface 48 remains in position to hold the moveable switch contact 52 from moving into contact with the stationary switch contact 54. As the shutter mechanism 16 is released, the actuator stop 58 moves upward and out of the way of the shutter mechanism interface 44, thereby releasing the actuator 38 and allowing it to pivot forward such that the moveable switch contact 52 is brought into contact with the stationary switch contact 54. The closing of the contacts of the motor activation switch 36 activates the motor 30 to drive the pinion gear 32, the cluster gear 34 and the face gear 28 to initiate film advance. The advancement of film causes the metering mechanism 26 to interact with a metering cam (not shown) and move back to its initial position, resetting a shutter mechanism of the camera 10, and bringing the metering mechanism 26 back in contact with the metering mechanism interface 50 of the actuator 38. The actuator 38 is then pivoted back to its initial position, which causes the switch interface 48 to interface with the moveable switch contact 52 and move it out of contact with the stationary switch contact 54 to turn off the motor 30 and terminate film advancement. The single use camera 10 is then ready to initiate another exposure operation.

In the event that the shutter mechanism 16 is depressed prior to the completion of the film advance and the return of the metering mechanism 26 to its initial position, the actuator stop 58 of the shutter mechanism 16 will contact the shutter mechanism interface 44 as it moves downward, thereby causing the actuator 38 to pivot back toward its initial position and deactivate the motor 30. Once the shutter mechanism 16 is released, the actuator stop 58 will move upward and the actuator 38 will be free to pivot forward to reinitiate operation of the film advance motor 30 until the metering mechanism 26 is reset.

Figure 11:
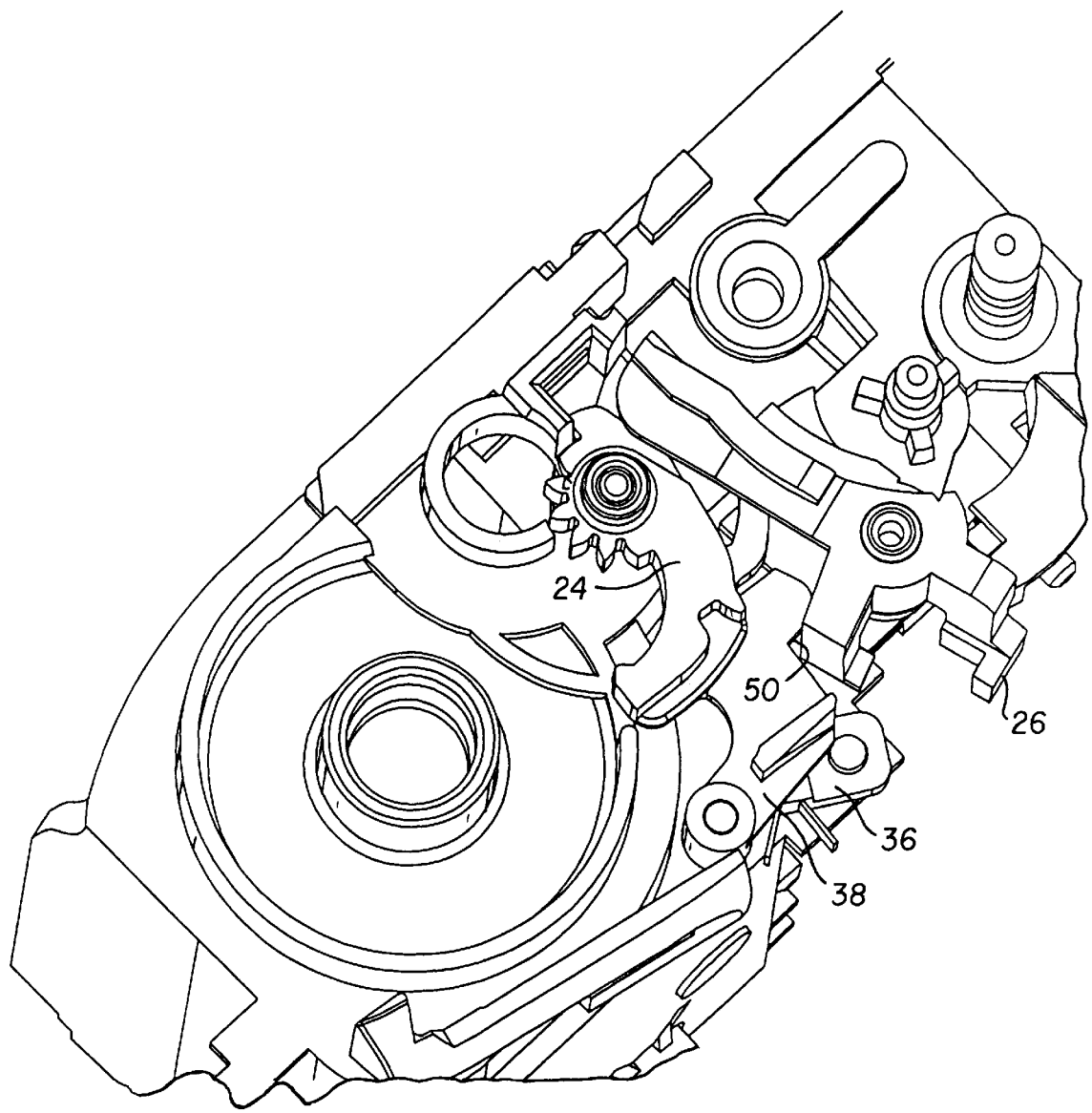
FIG. 11 is a top view illustrating the positions of the actuator, metering mechanism and active lightlock driver after exposure of a roll of film.
Figure 12:
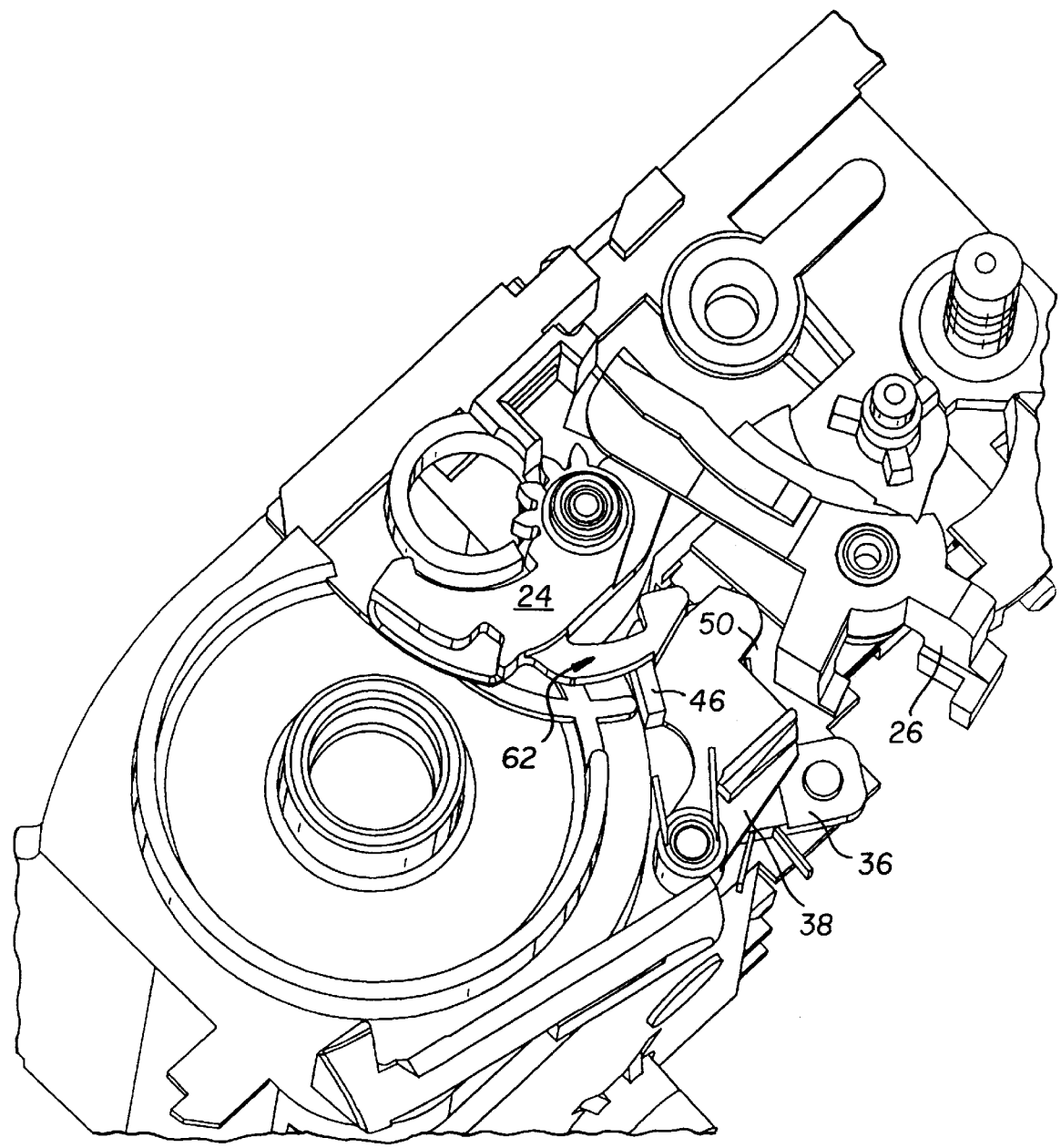
FIG. 12 illustrates a top view of the interfacing of the active lightlock hook with the active lightlock interface of the actuator.
Figure 13:
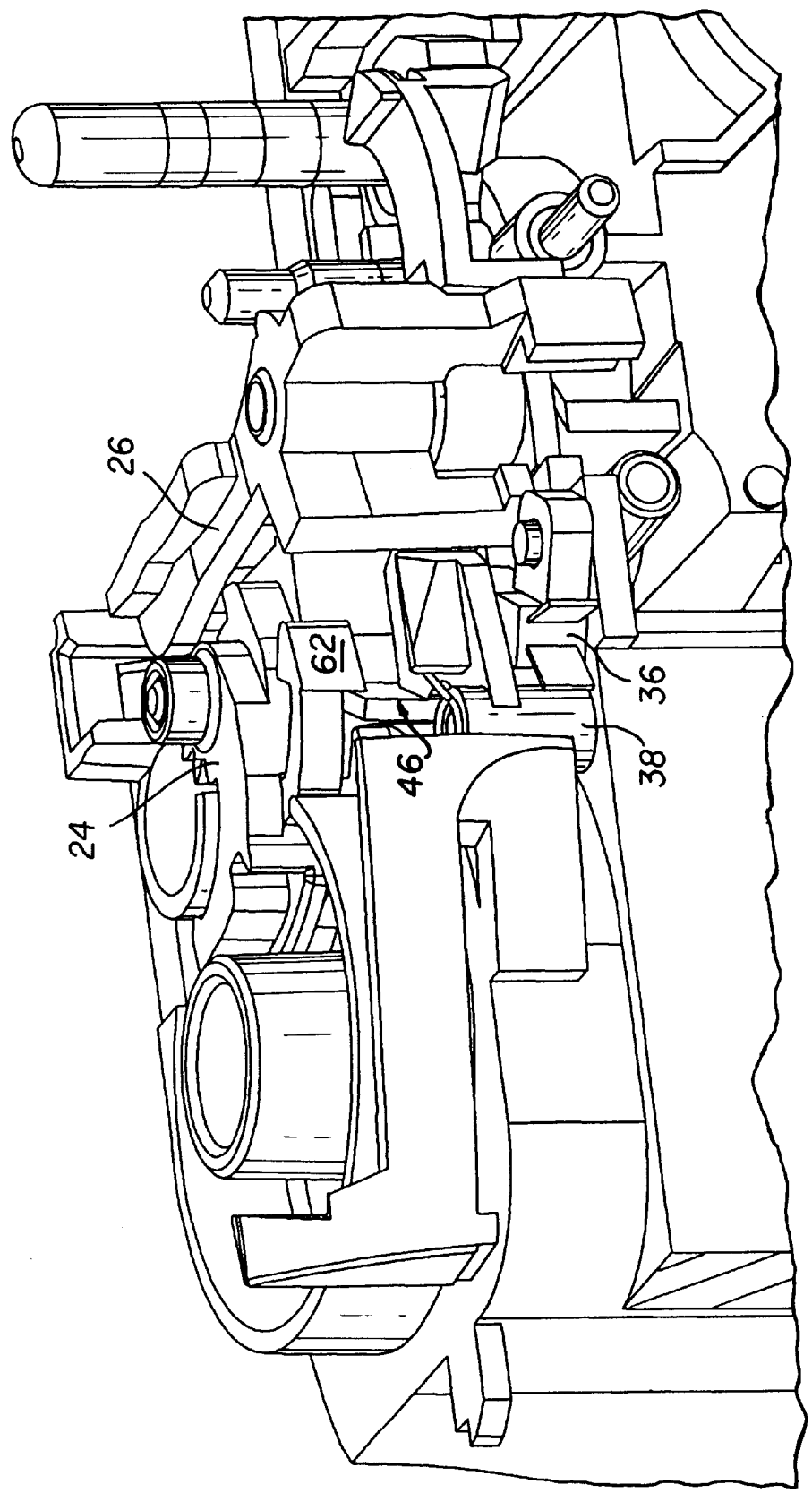
FIG. 13 illustrates a front view of the interfacing of the active lightlock hook with the active lightlock interface of the actuator.

It should be noted that the film is not metered after the final frame, but is rewound back into its cartridge. A feature is provided in which the active lightlock driver 24 hooks onto and pivots the actuator 38 to turn off the film advance motor 30 once the film has been wound into the cartridge and the active lightlock of the cartridge is closed. FIG. 11 illustrates the position of the actuator 38 with respect to the active lightlock driver 24 after an entire roll of film has been exposed. As shown in FIGS. 12 and 13, an active lightlock hook 62 provided on the active lightlock driver 24 catches the active lightlock interface 46 provided on the actuator 38 to pivot the actuator 38 back to its initial position, thereby causing the moveable switch contact 52 to move out of contact with the stationary switch contact 54 to turn off the film advance motor 30.

The invention has been described in detail with reference to certain preferred embodiments thereof. It will be understood, however, that modifications and variations are possible with the scope of the appended claims. For example, although the invention as been described with reference to a single use camera, the actuator may be readily incorporated into any type of camera utilizing a motor advance film system.

PARTS LIST 10 single use camera
12 lens 14 electronic flash unit
16 shutter release mechanism
18 optical viewfinder
20 camera frame
22 motor mount
24 active lightlock driver
26 metering mechanism
28 face gear
29 keeper plate
30 film advancing motor
32 pinion gear
34 cluster gear
36 motor activation switch
38 actuator
40 spring
42 actuator pivot mounting
44 shutter mechanism interface
45 lead in face
46 active lightlock interface
48 switch interface
50 metering mechanism interface
52 moveable switch contact
54 stationary switch contact
56 switch locator pin
58 actuator stop
60 extended arm
62 active lightlock hook

What is claimed is:

1. A camera comprising:

a power source;

a motor coupled to a film advance gear train;

a motor activation switch, including a stationary contact and a moveable contact, coupled to the power source and the motor;

a shutter actuation mechanism;

a metering mechanism;

an actuator including a metering mechanism interface, a motor activation switch interface, and a shutter mechanism interface; and a spring mechanism that biases the actuator to a contact position where the motor activation switch interface permits contact between the moveable contact and the stationary contact.

2. A camera as claimed in claim 1, wherein the metering mechanism contacts with the metering mechanism interface in an exposure ready state to hold the actuator in an initial position in which the motor activation switch interface interfaces with the moveable contact to prevent contact between the moveable contact and the stationary contact.

3. A camera as claimed in claim 1, wherein the shutter mechanism, when depressed, interfaces with the shutter mechanism interface to hold the actuator in the initial position and moves the metering mechanism out of contact with the metering mechanism interface.

4. A camera as claimed in claim 1, wherein the actuator moves to the contact position when the shutter mechanism is released.

5. A camera as claimed in claim 1, wherein the movement of the actuator to the contact position activates the motor to drive the film advance gear train.

6. A camera as claimed in claim 5, wherein the actuator remains in the contact position until it is returned to an initial position by the metering mechanism.

7. A camera as claimed in claim 1, wherein the camera further comprises an active lightlock driver and the actuator further comprises an active lightlock interface that interfaces with the active lightlock driver to return the actuator to an initial position at an end of roll.

8. A camera as claimed in claim 1, wherein the shutter mechanism includes an actuator stop that interfaces with the shutter mechanism interface of the actuator when the shutter mechanism is depressed.

* * * * *